A. R. CURTIS.
AUTOMOBILE TRAILER TRUCK AND HITCH FOR SAME.
APPLICATION FILED OCT. 12, 1915.
1,213,080.
Patented Jan. 16, 1917.
2 SHEETS—SHEET 2.
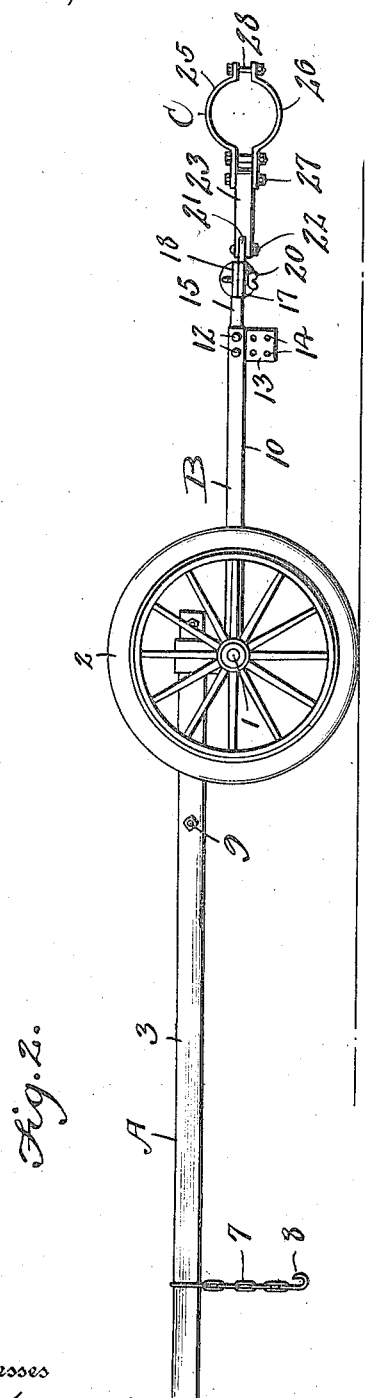
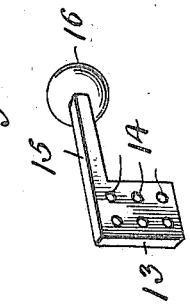
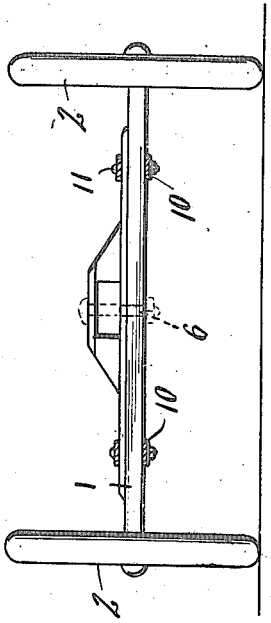
Inventor
A. R. Curtis,
By Victor J. Evans
Attorney
Witnesses

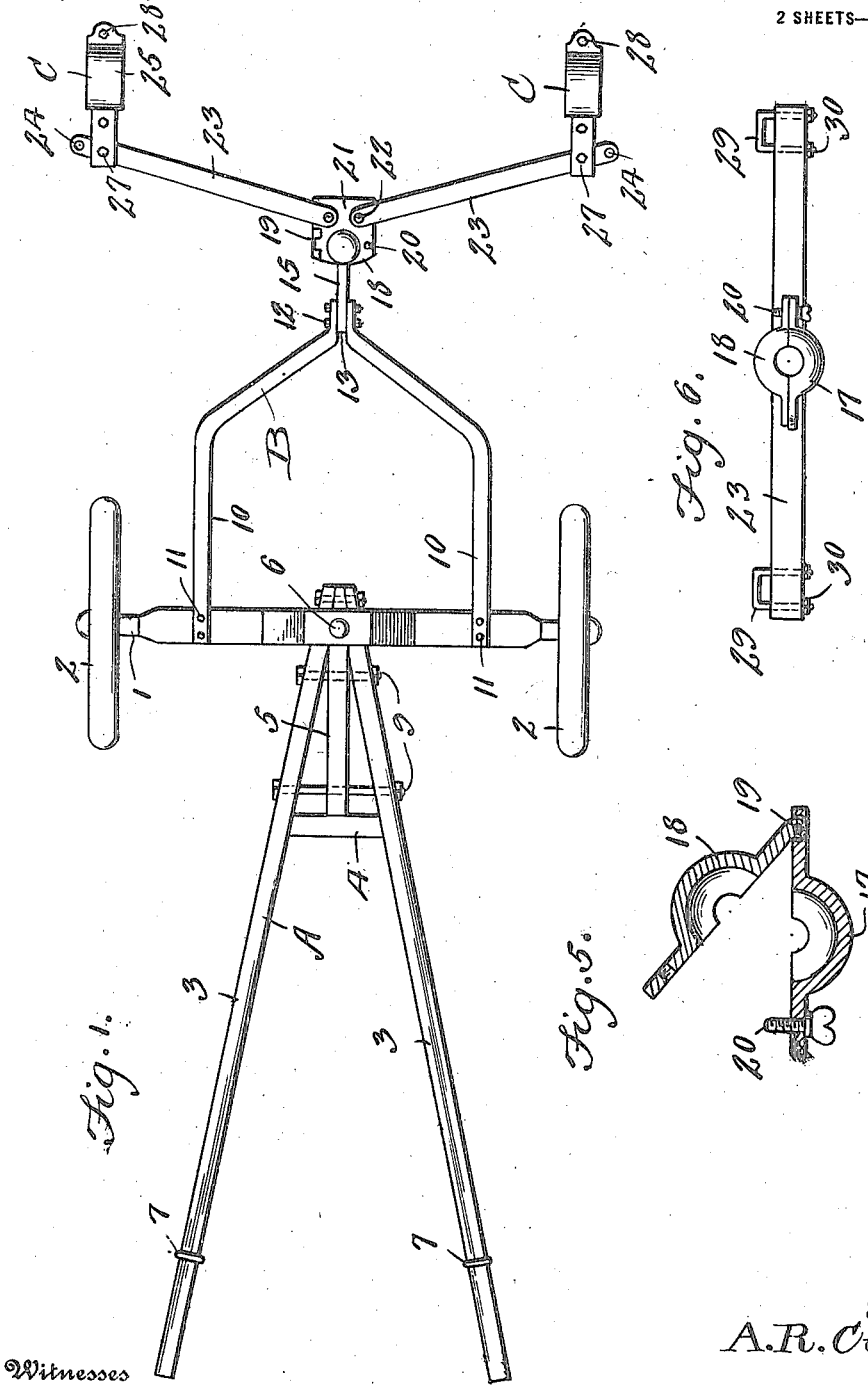

UNITED STATES PATENT OFFICE.

ALEXANDER R. CURTIS, OF MINNEAPOLIS, MINNESOTA.

AUTOMOBILE TRAILER-TRUCK AND HITCH FOR SAME.

1,213,080.

Specification of Letters Patent.

Patented Jan. 16, 1917.

Application filed October 12, 1915. Serial No. 55,497.

*To all whom it may concern:*

Be it known that I, ALEXANDER R. CURTIS, citizen of the United States, residing at Minneapolis, in the county of Hennepin and State of Minnesota, have invented new and useful Improvements in Automobile Trailer-Trucks and Hitches for Same, of which the following is a specification.

This invention relates to automobile trailer trucks, the object in view being to produce a simple, reliable and efficient truck for the purpose of enabling one automobile or other machine to tow to a place of repair an automobile or similar vehicle which has broken down and particularly a machine in which one of the carrying wheels thereof has been so injured or broken as to render it impossible to tow the machine in by the ordinary means now employed.

A further object of the invention is to produce a truck of the class referred to which is adapted to be attached to any automobile or similar vehicle to be towed and also to be attached or coupled to the towing machine.

With the above and other objects in view, the invention consists in the novel construction, combination and arrangement of parts, as herein described, illustrated and claimed.

In the accompanying drawings:—Figure 1 is a plan view of the trailer truck of this invention. Fig. 2 is a side elevation of the same. Fig. 3 is a rear end view of the axle and its wheels. Fig. 4 is a detail perspective view of one member of a ball and socket joint. Fig. 5 is a detail view of the other member of the ball and socket joint. Fig. 6 is an elevation of the draft arms and one member of the ball and socket joint, showing means for securing the extremities of the arms to the springs of the towing machine.

The trailer truck contemplated in this invention embodies essentially an axle 1 having mounted on the opposite extremities thereof carrying wheels 2. Extending rearwardly from the axle 1 is an automobile body supporting beam designated generally at A and comprising the rearwardly diverging side bars 3 which are connected together at their forward ends, 4 designating a cross brace for the arms 3 and 5, a longitudinal brace extending from the brace 4 to the convergent ends of the side bars 3. The body supporting beam thus constructed is connected pivotally by a king bolt 6 to the center of the axle 1 enabling said axle to be turned for the purpose of steering the truck, after the body support A has been secured in fixed relation to the frame of the machine to be towed.

In order to facilitate fastening the side bars 3 of the beam A to the frame of an automobile, chains 7 are provided, the same being shiftable longitudinally of the bars 3 and being provided with terminal hooks 8, the said chains 7 being adapted to be wrapped around the side bars or any other convenient portions of the frame of the automobile after which the hooks 8 are inserted through any of the links of the chains. Cross bolts 9 firmly fasten the side bars 3 of the beam A together.

Extending forwardly from the axle 1 is a tongue designated generally at B and comprising the two side bars 10 the rear extremities of which are bolted or otherwise fixedly secured at 11 to the axle. The forward portions of the bars 10 converge and are fastened by means of bolts 12 firmly against opposite sides of a vertically elongated plate 13 formed with vertical series of holes 14 for the bolts 12 thereby permitting the plate 13 to be adjusted upwardly and downwardly relatively to the tongue B. The plate 13 has extending forwardly therefrom a shank 15 provided at its forward extremity with a ball 16 which is received in a split socket which receives the ball 16, said socket comprising the pivotally connected members 17 and 18 which are hinged together at 19 and adapted to be fastened in proper relation to each other to hold the ball 16 in place therein by means of a clamping screw 20 preferably of the winged or thumb type. The socket member of the ball and socket joint thus formed constitutes part of a draw head 21 to which are pivotally connected at 22 oppositely extending draft arms 23 formed adjacent to their outer ends with series of holes 24 to admit of the adjustment lengthwise of said arms 23 of a pair of axle embracing clips each designated generally at C and comprising two oppositely bowed members 25 and 26 fastened to the adjacent arm 23 by one or more bolts 27, the opposite ends thereof being clamped around the rear axle housing of the towing machine by means of one or more bolts 28.

In lieu of the axle embracing clips C illustrated in Figs. 1 and 2, it is intended to also employ the arrangement shown in Fig. 6 wherein the arms 23 are provided at their ends with U-shaped clips or bolts 29 each similar in all respects to an axle clip, the clips 29 being adapted to be placed around the rear springs of the towing machine and tightened by means of nuts 30.

In operation, the injured machine is jacked up so as to elevate the wheels of the machine clear of the ground and then the trailer truck is pushed under the body of the machine, the machine being then lowered upon the trailer truck and the rearwardly diverging bars 3 of the body supporting beam are secured by means of the chains 7 to the frame of the machine to be towed. By the means described, the draft arms 23 are then attached to the towing machine. By means of the ball and socket joint, all inequalities in the road are provided for so that a constant and uniform pull may be obtained on the truck, the king bolt 6 permitting the axle 1 with its wheels to turn for the purpose of enabling the towed machine to trail properly and directly behind the towing machine. It will also be observed that the body supporting beam A may be detached from the remainder of the truck by removing the king bolt 6 and that the draft head with the draft arms and attaching means may be also disconnected from the tongue B enabling the truck to be carried in the body of the wrecking machine.

Having thus described my invention, I claim:—

In an automobile trailer truck, an axle, wheels thereon, automobile body supporting means embodying rearwardly diverging beams having a fixed relation to each other and pivotally connected at its forward end to said axle, chains adjustable longitudinally of said beams for securing the same to the frame of the trailing automobile, and a draft tongue extending forwardly from said axle.

In testimony whereof I affix my signature in presence of two witnesses.

ALEXANDER R. CURTIS.

Witnesses:
G. T. PROPPER,
L. L. SANFORD.